(12) United States Patent
Babu et al.

(10) Patent No.: US 12,244,736 B2
(45) Date of Patent: Mar. 4, 2025

(54) METHODS AND APPARATUS FOR SECURE CONFIGURATION OF A COMPUTE DEVICE

(71) Applicant: Musarubra US LLC, San Jose, CA (US)

(72) Inventors: Arvind Srinivasa Babu, Bengaluru (IN); Arthur S. Zeigler, Hillsboro, OR (US)

(73) Assignee: MUSARUBA US LLC, San Jose, CA (US)

( * ) Notice: Subject to any disclaimer, the term of this patent is extended or adjusted under 35 U.S.C. 154(b) by 138 days.

(21) Appl. No.: 18/163,108

(22) Filed: Feb. 1, 2023

(65) Prior Publication Data

US 2024/0259219 A1    Aug. 1, 2024

(51) Int. Cl.
*H04L 9/40*  (2022.01)
*H04L 9/32*  (2006.01)

(52) U.S. Cl.
CPC .......... *H04L 9/3268* (2013.01); *H04L 9/3247* (2013.01); *H04L 63/20* (2013.01)

(58) Field of Classification Search
CPC ..... H04L 9/3268; H04L 9/3247; H04L 63/20; H04L 63/0823
See application file for complete search history.

(56) References Cited

U.S. PATENT DOCUMENTS

| | | | |
|---|---|---|---|
| 2012/0159178 A1* | 6/2012 | Lin | H04L 63/065 |
| | | | 713/176 |
| 2018/0176023 A1* | 6/2018 | Prickett | H04L 9/0822 |

* cited by examiner

*Primary Examiner* — Brian F Shaw
(74) *Attorney, Agent, or Firm* — Hanley, Flight & Zimmerman, LLC

(57) ABSTRACT

Methods, apparatus, systems, and articles of manufacture are disclosed to securely configure an endpoint. Example apparatus disclosed herein include memory, machine readable instructions, and processor circuitry to at least one of instantiate or execute the machine readable instructions to access a certificate at an ePolicy orchestrator, the certificate including private key information, access a configuration, the configuration including policy information and installation instructions, sign the configuration using the private key information to securely sign the configuration, the signed configuration including a secured signature, create a secured installer using the certificate and the signed configuration, the secured installer including an agent, and provide the secured installer to an endpoint for installation of the agent and execution of the endpoint.

20 Claims, 10 Drawing Sheets

METHODS AND APPARATUS FOR SECURE CONFIGURATION OF A COMPUTE DEVICE

FIELD OF THE DISCLOSURE

This disclosure relates generally to endpoint configuration and, more particularly, to methods and apparatus for secure configuration of a compute device.

BACKGROUND

Organizations seek to secure their computer equipment from malicious interference. In addition to traditional anti-virus scanners, organizations utilize policies that control what activities are allowed on a computer system. Such policies may be implemented at various computer equipment and may restrict, for example, types of communications allowed or disallowed to/from the computer equipment, operations that may be performed by the computer equipment, etc.

BRIEF DESCRIPTION OF THE DRAWINGS

In general, the same reference numbers will be used throughout the drawing(s) and accompanying written description to refer to the same or like parts. The figures are not to scale.

Figure 1:
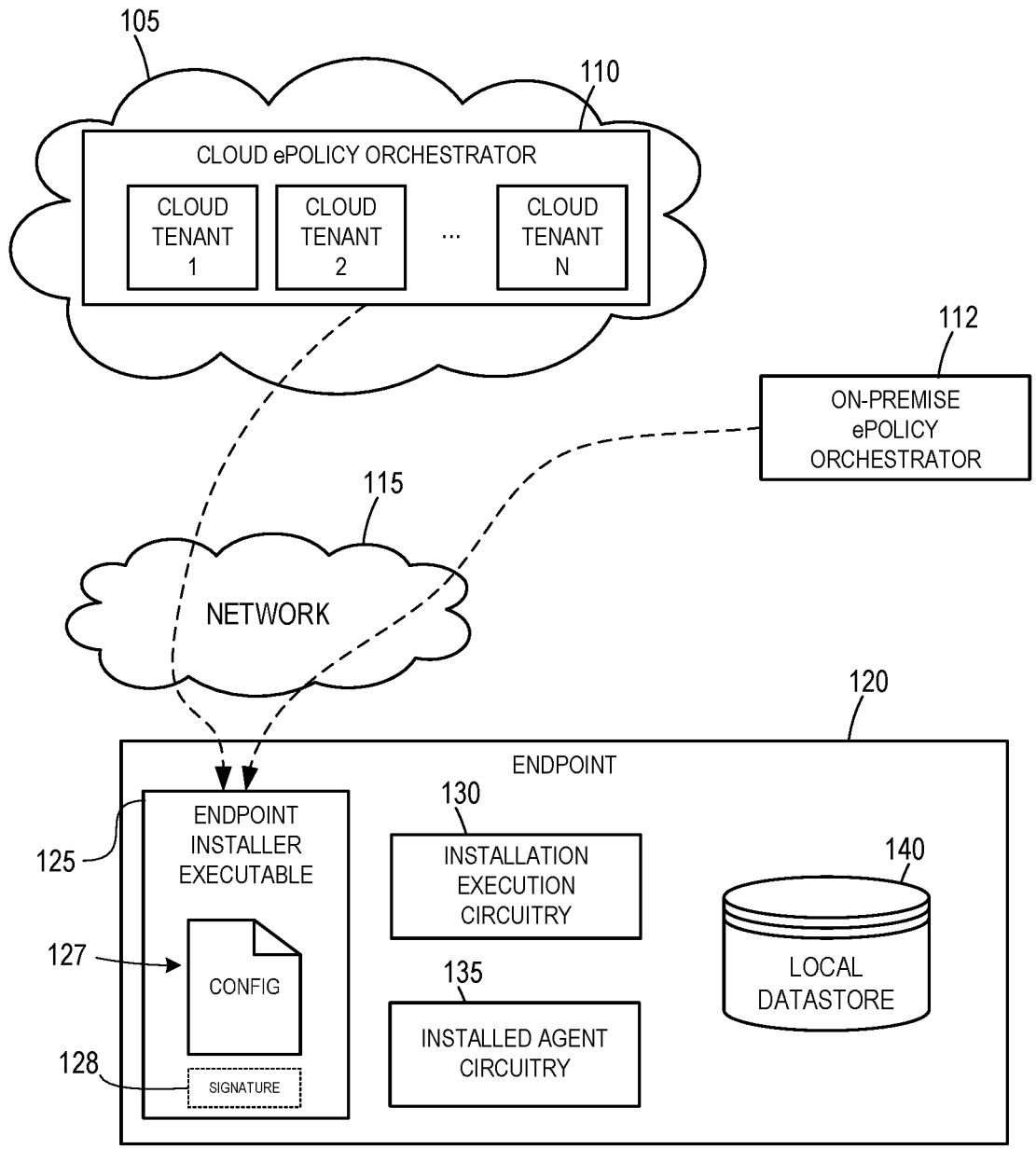
FIG. 1 is a block diagram illustrating an example computing environment including a policy orchestrator

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Organizations use policies to control activities that may be performed by endpoints (e.g., compute nodes, user computers, servers, routers, computer equipment, etc.) within their computing environment. In some environments, many such endpoints may exist. For example, a computing environment may have hundreds, if not thousands (or even millions) of computing devices to be managed. To manage such endpoints, organizations utilize a policy orchestrator. For example, Trellix ePolicy orchestrator (ePO) is a product that is used to deploy agents into hundreds and thousands of endpoints so that they can be managed by ePO. ePO is currently used by over fifty thousand organizations, managing more than fifty five million computing devices.

FIG. 1 is a block diagram illustrating an example computing environment including a policy orchestrator. In the illustrated example of FIG. 1, there are two different implementations of ePO: a cloud ePolicy orchestrator 110 and an on-premise ePolicy orchestrator 112. The cloud ePolicy orchestrator 110 of FIG. 1 is implemented within a cloud environment 105 and, as such, may be hosted by a third party (e.g., a cloud services provider). In such an example, the cloud ePolicy orchestrator 110 supports endpoints for multiple cloud tenants (e.g., customers). For example, the cloud ePolicy orchestrator 110 may provide policy management functionality for multiple different organizations wishing to manage their endpoint(s).

In contrast, the example on-premise ePolicy orchestrator 112 is hosted by an organization that manages their own endpoints. In some examples, the on-premise ePolicy orchestrator 112 may be implemented in a same physical location as the endpoint(s) being managed (e.g., within a same office). However, in some other examples, the on-premise ePolicy orchestrator may be implemented at a remote location (e.g., a remote server) that is able to communicate with the endpoint(s) of the organization.

Common to both the cloud ePolicy orchestrator 110 implementation and the on-premise ePolicy orchestrator 112, each instance of the ePO communicates with an endpoint 120 via a network 115 to provide a policy to be implemented by the endpoint. In the illustrated example of FIG. 1 the endpoint 120 represents any sort of computing device including, for example, a server, a personal computer, a mobile device, a tablet computer, a compute node, networking equipment, etc. The network 115 represents any communication network by which the ePolicy orchestrator 110, 112, may communicate with the endpoint 120 such as, for example, a private network, a virtual private network (VPN), the Internet, various combinations thereof, etc.

Each ePolicy orchestrator 110, 112 has a different configuration including parameters such as, for example, tenant address, customer account, IP address, Server name, Certificates, Keys, etc. that provide an initial security enclave to the endpoint so that the enclave can securely talk to the ePO with which it is supposed to communicate. This configuration information is typically embedded within the installer 125 of the agent, which prevents the configuration from being Authenticode signed. At runtime (e.g., when deploying a new endpoint installer), a new package is generated when a customer wants to get the endpoint installer 125 of the agent to install onto the endpoint. This embedded data is not secure and can be manipulated by an attacker, allowing the endpoint 120 to be redirected to a different ePO server (e.g., a malicious ePO server) if the installer is mis-handled by the end user.

Examples disclosed herein provide authentication and integrity to the uniquely supplied configuration of an instance of ePO such that the integrity of the configuration can be verified and/or validated (e.g., at the time of installation and/or execution).

Examples disclosed herein provide integrity to the related configuration files embedded within an endpoint installer. The installer will use the information to provision an endpoint agent to communicate with an instance of the ePO. It will also provide basic authentication that the configuration was indeed supplied by an ePO all without the need for the user to do anything more than executing the installer which is trusted by the OS due to the installers Authenticode signature.

Endpoint installers are typically digitally signed at build time. Such endpoint installers are free of any configuration information embedded within the executable and have no capacity to validate configuration passed from the command-line. The configuration information, which includes homing details to the server along with other security artifacts like certificates and keys, are generally unique to every instance of the server and these cannot be embedded into the endpoint installer at compilation time (e.g., when the source code is built into the installer). Thus, to allow customers a single-click deployment option where command-line details are unnecessary, the configuration information is embedded into the installer at the time of generating a package for an endpoint from the server-specific configuration. This configuration is generally unsecure and there is no way to determine if the configuration was tampered with, or genuinely provided from an ePO server. Examples disclosed herein provide authentication to prove that a configuration originated from an ePO server, and that the configuration is free from tampering by malicious actors.

Examples disclosed herein improve over prior approaches because such prior approaches do not provide a security mechanism like integrity or authentication when receiving configuration information. Current mechanisms to supply configuration information are prone to manipulation and attacks that leave the products and features with weak security mechanisms which could allow malicious modification of configuration information. Such malicious modification could, for example, point the endpoint to an instance of ePO not associated with the customer. Such a modification could result in malicious security policies being applied to an endpoint (e.g., a security policy that allows malicious activities to take place). Examples disclosed herein ensure that the supplied configuration is indeed supplied by a valid entity (like ePO) and ensures that the supplied configuration data is not tampered with, without needing to digitally sign the entire process at executable generation time.

Examples disclosed herein provide integrity to configuration information and also provide a mechanism to authenticate installers with either provider-based authentication or with authentication of customers in On-premises environments.

The example endpoint 120 of the illustrated example of FIG. 1 includes an endpoint installer executable 125, installation execution circuitry 130, installed agent circuitry 135, and a local data store 140. The example endpoint installer executable 125 includes a configuration 127 and a signature 128. In some examples, the configuration 127 and the signature 128 are integrated into a single configuration.

The example endpoint installer executable 125 of the illustrated example of FIG. 1 is an executable package provided by the ePO 110, 112 to the endpoint for execution. The example configuration 127 includes policy information and/or installation instructions to update/install the endpoint 120. The example signature 128 provides a security protocol for ensuring the configuration/installation package is free from manipulation and is proper for the endpoint 120.

The example installation execution circuitry 130 and example installed agent circuitry 135 of FIG. 1 may be instantiated (e.g., creating an instance of, bring into being for any length of time, materialize, implement, etc.) by processor circuitry such as a central processing unit executing instructions. Additionally or alternatively, the example installation execution circuitry 130 and example installed agent circuitry 135 of FIG. 1 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 1 may, thus, be instantiated at the same or different times. Some or all of the circuitry may be instantiated, for example, in one or more threads executing concurrently on hardware and/or in series on hardware. Moreover, in some examples, some or all of the circuitry of FIG. 1 may be implemented by microprocessor circuitry executing instructions to implement one or more virtual machines and/or containers.

The example installation execution circuitry 130 of the illustrated example of FIG. 1 executes the endpoint installer executable 125 to verify the configuration details and installs the agent circuitry 135 (e.g., an endpoint). In some examples, the installation execution circuitry 130 is instantiated by processor circuitry executing installation execution instructions and/or configured to perform operations such as those represented by the flowchart of FIG. 5.

In some examples, the endpoint 120 includes means for installing an endpoint. For example, the means for installing may be implemented by installation execution circuitry 130. In some examples, the installation execution circuitry 130 may be instantiated by processor circuitry such as the example processor circuitry 712 of FIG. 7. For instance, the installation execution circuitry 130 may be instantiated by the example microprocessor 800 of FIG. 8 executing machine executable instructions such as those implemented by at least blocks 510, 520, 530, 540, 550, 560, and 570 of FIG. 5. In some examples, the installation execution circuitry 130 may be instantiated by hardware logic circuitry, which may be implemented by an ASIC, XPU, or the FPGA circuitry 900 of FIG. 9 structured to perform operations corresponding to the machine readable instructions. Additionally or alternatively, the installation execution circuitry 130 may be instantiated by any other combination of hardware, software, and/or firmware. For example, the installation execution circuitry 130 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example installed agent circuitry 135 of the illustrated example of FIG. 1 executes at the endpoint 120 to enforce security policies provided by the ePO 110, 112. In some examples, the local datastore 140 contains information related to the execution of the endpoint 120 such as prior endpoint 120 execution information. In some examples, the endpoint 120 stores information to the local datastore 140 to be accessed at a later time and/or for local monitoring of the endpoint 120 execution. In some examples, the installed agent circuitry 135 is instantiated by processor circuitry executing installed agent instructions and/or configured to perform operations such as those represented by the flowchart of FIG. 6.

In some examples, the endpoint 120 includes means for executing the endpoint 120. For example, the means for executing may be implemented by installed agent circuitry 135. In some examples, the installed agent circuitry 135 may be instantiated by processor circuitry such as the example processor circuitry 712 of FIG. 7. For instance, the installed agent circuitry 135 may be instantiated by the example microprocessor 800 of FIG. 8 executing machine executable instructions such as those implemented by at least blocks 610, 620, 630, 640, 650, and 660 of FIG. 6. In some examples, the installed agent circuitry 135 may be instantiated by hardware logic circuitry, which may be implemented by an ASIC, XPU, or the FPGA circuitry 900 of FIG. 9 structured to perform operations corresponding to the machine readable instructions. Additionally or alternatively, the installed agent circuitry 135 may be instantiated by any other combination of hardware, software, and/or firmware. For example, the installed agent circuitry 135 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 2:
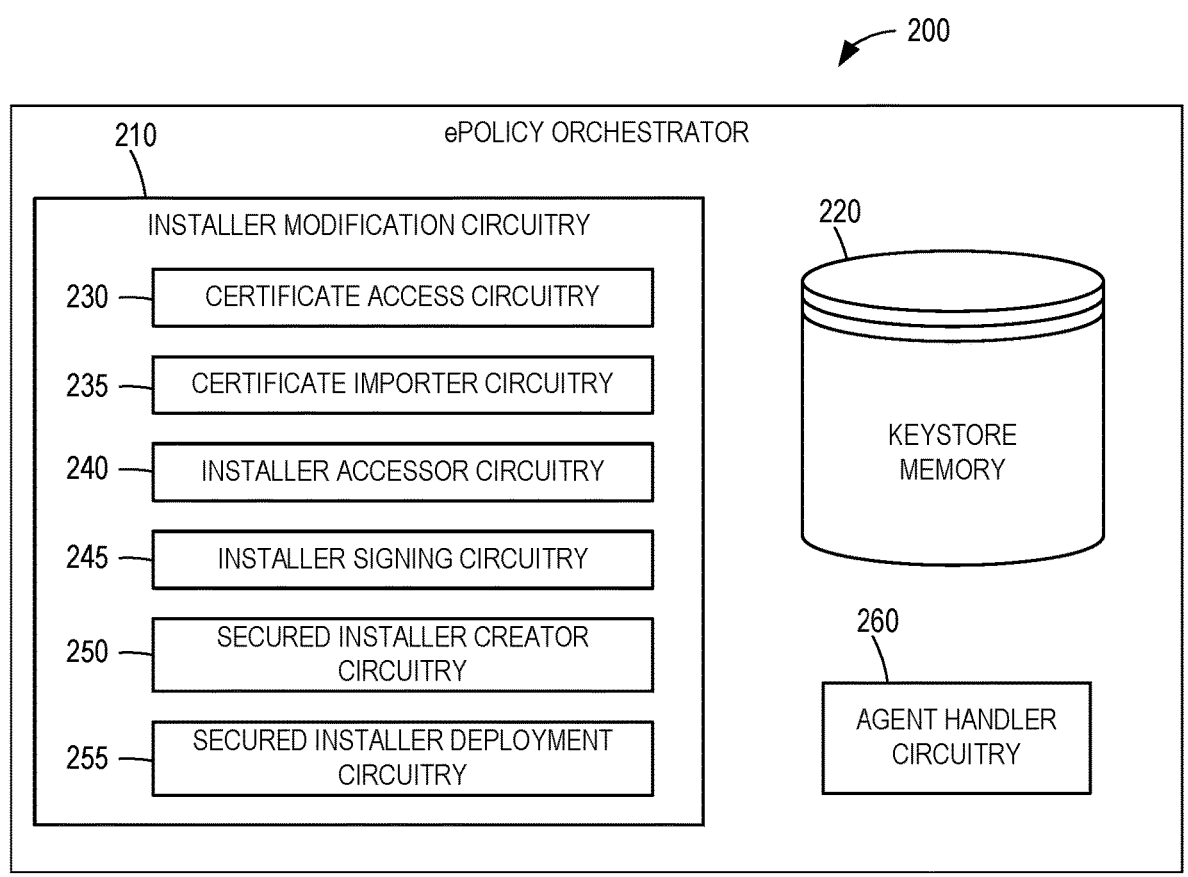
FIG. 2 is a block diagram of an example ePolicy orchestrator.

FIG. 2 is a block diagram of an ePolicy Orchestrator 200. The example ePolicy Orchestrator 200 of FIG. 2 may be used to implement the example cloud ePolicy orchestrator 110 or the on-premise ePolicy orchestrator 112 of FIG. 1. The example installer modification circuitry 210 of FIG. 2 may be instantiated (e.g., creating an instance of, bring into being for any length of time, materialize, implement, etc.) by processor circuitry such as a central processing unit executing instructions. Additionally or alternatively, the example installer modification circuitry 210 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

The example ePolicy orchestrator 200 of FIG. 2 includes installer modification circuitry 210, a keystore memory 220, and agent handler circuitry 260. The example installer modification circuitry 210 includes certificate access circuitry 230, certificate importer circuitry 235, installer accessor circuitry 240, installer signing circuitry 245, secured installer creator circuitry 250, and secured installer deployment circuitry 255

The example keystore memory 220 of the illustrated example of FIG. 2 stores information related to the creation of a secured installer. In some examples, the keystore memory 220 includes private configuration information such as a private key certificate.

Figure 3:
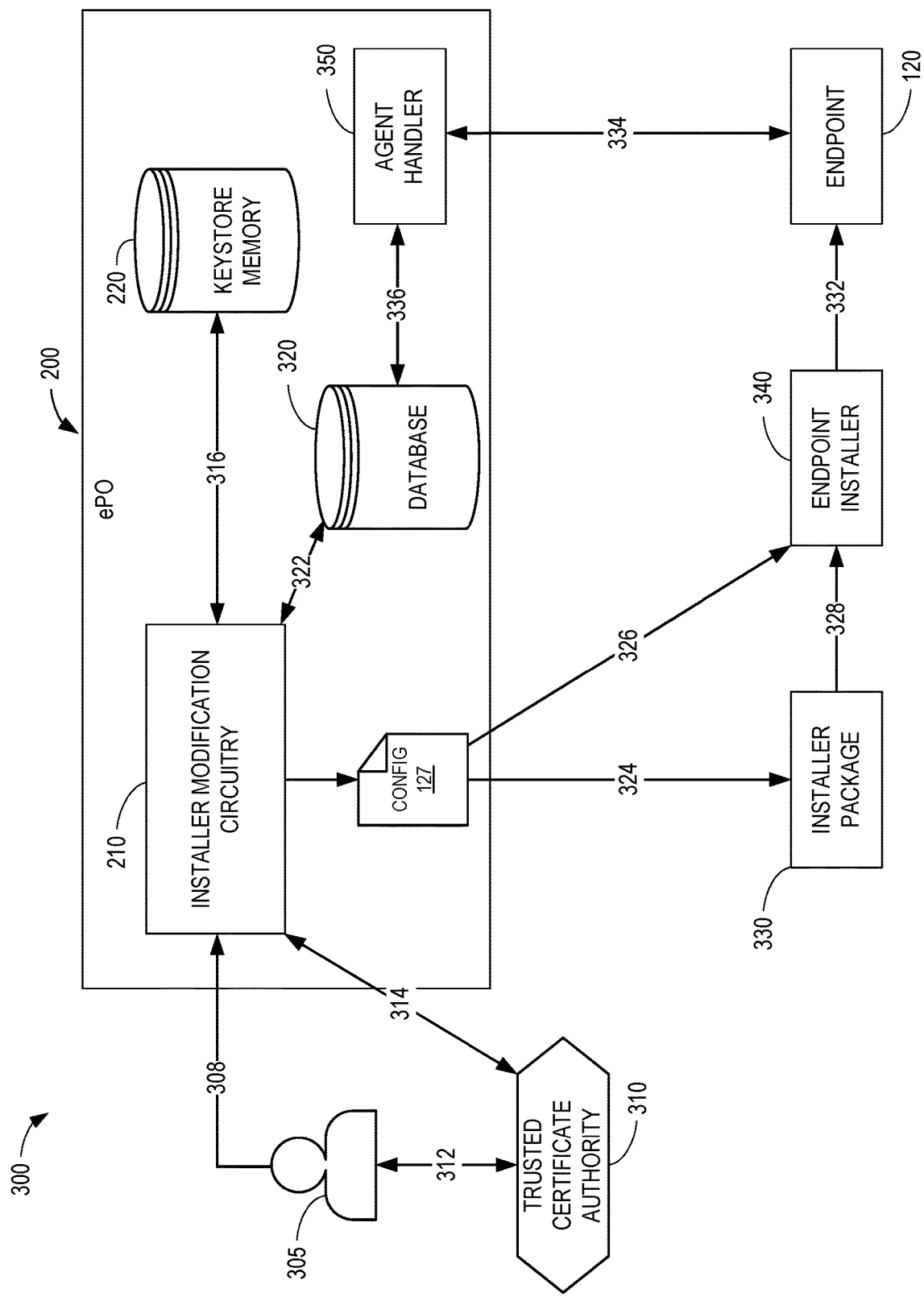
FIG. 3 is a block diagram of an example process for securely configuring an endpoint of FIG. 1.

The example certificate access circuitry 230 of the illustrated example of FIG. 2 accesses the certificate provided by an administrator (e.g., the ePO administrator 305 of FIG. 3). In some examples, the certificate access circuitry 230 is instantiated by processor circuitry executing certificate access instructions and/or configured to perform operations such as those represented by the flowchart of FIG. 4.

In some examples, the ePolicy orchestrator 200 includes means for accessing certificates from an administrator. For example, the means for accessing may be implemented by certificate access circuitry 230. In some examples, the certificate access circuitry 230 may be instantiated by processor circuitry such as the example processor circuitry 712 of FIG. 7. For instance, the certificate access circuitry 230 may be instantiated by the example microprocessor 800 of FIG. 8 executing machine executable instructions such as those implemented by at least blocks 420, 430, and 440 of FIG. 4. In some examples, the certificate access circuitry 230 may be instantiated by hardware logic circuitry, which may be implemented by an ASIC, XPU, or the FPGA circuitry 900 of FIG. 9 structured to perform operations corresponding to the machine readable instructions. Additionally or alternatively, the certificate access circuitry 230 may be instantiated by any other combination of hardware, software, and/or firmware. For example, the certificate access circuitry 230 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example certificate importer circuitry 235 of the illustrated example of FIG. 2 generates or imports a certificate from a trusted certificate authority (e.g., the trusted certificate authority 310 of FIG. 3). In some examples, the certificate importer circuitry 235 is instantiated by processor circuitry executing certificate importer instructions and/or configured to perform operations such as those represented by the flowchart of FIG. 4.

In some examples, the ePolicy orchestrator 200 includes means for importing a certificate. For example, the means for importing may be implemented by certificate importer circuitry 235. In some examples, the certificate importer circuitry 235 may be instantiated by processor circuitry such as the example processor circuitry 712 of FIG. 7. For instance, the certificate importer circuitry 235 may be instantiated by the example microprocessor 800 of FIG. 8 executing machine executable instructions such as those implemented by at least blocks 425, 430, and 440 of FIG. 4. In some examples, the certificate importer circuitry 235 may be instantiated by hardware logic circuitry, which may be implemented by an ASIC, XPU, or the FPGA circuitry 900 of FIG. 9 structured to perform operations corresponding to the machine readable instructions. Additionally or alternatively, the certificate importer circuitry 235 may be instantiated by any other combination of hardware, software, and/or firmware. For example, the certificate importer circuitry 235 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the ePolicy orchestrator 200 also includes means for generating a certificate. For example, the means for generating may be implemented by certificate importer circuitry 235. When a certificate is not provided/does not exist, the certificate importer circuitry 235 can import a pre-defined certificate or generate a certificate based on configuration parameters that are stored in the keystore memory 220 or any other location.

In some examples, the ePolicy generator 200 also includes means for requesting a certificate to be generated. For examples, the means for requesting may be implemented by certificate importer circuitry 235. When a certificate is not provided/does not exist, the certificate importer circuitry 235 can request a certificate to be generated (e.g., the means for generating as disclosed above).

In some examples, the ePolicy orchestrator 200 also includes means for storing the certificates and associated trust information to the keystore memory 220. As disclosed in further detail below in reference to FIG. 4, the storing of the certificates to the keystore memory 220 may be performed by either the certificate access circuitry 230 or the certificate importer circuitry 235, depending on whether the certificate existed prior to initiating the access/import/generation.

The example installer accessor circuitry 240 of the illustrated example of FIG. 2 accesses the configuration information and a provided endpoint installer. In examples disclosed herein, endpoint installers are digitally signed at build time. Endpoint installers are free of any configuration information embedded within the executable and have no capacity to validate configuration passed from the command-line. Examples disclosed herein provide authentication for endpoint installers via a configuration originated from an ePO server. Such a configuration is free from tampering by malicious actors. In some examples, the installer accessor circuitry 240 is instantiated by processor circuitry executing installer accessor instructions and/or configured to perform operations such as those represented by the flowchart of FIG. 4.

In some examples, the ePolicy orchestrator 200 includes means for accessing the configuration and endpoint installer. For example, the means for accessing may be implemented by installer accessor circuitry 240. In some examples, the installer accessor circuitry 240 may be instantiated by processor circuitry such as the example processor circuitry 712 of FIG. 7. For instance, the installer accessor circuitry 240 may be instantiated by the example microprocessor 800 of FIG. 8 executing machine executable instructions such as those implemented by at least blocks 450 of FIG. 4. In some examples, the installer accessor circuitry 240 may be instantiated by hardware logic circuitry, which may be implemented by an ASIC, XPU, or the FPGA circuitry 900 of FIG. 9 structured to perform operations corresponding to the machine readable instructions. Additionally or alternatively, the installer accessor circuitry 240 may be instantiated by any other combination of hardware, software, and/or firmware. For example, the installer accessor circuitry 240 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example installer signing circuitry 245 of the illustrated example of FIG. 2 signs the configuration provided by the installer accessor circuitry 240. In some examples, the installer signing circuitry 245 is instantiated by processor circuitry executing installer signing instructions and/or configured to perform operations such as those represented by the flowchart of FIG. 4.

In some examples, the ePolicy orchestrator 200 includes means for signing the configuration. For example, the means for signing may be implemented by installer signing circuitry 245. In some examples, installer signing circuitry 245 may be instantiated by processor circuitry such as the example processor circuitry 712 of FIG. 7. For instance, the installer signing circuitry 245 may be instantiated by the example microprocessor 800 of FIG. 8 executing machine executable instructions such as those implemented by at least blocks 460 of FIG. 4. In some examples, the installer signing circuitry 245 may be instantiated by hardware logic circuitry, which may be implemented by an ASIC, XPU, or the FPGA circuitry 900 of FIG. 9 structured to perform operations corresponding to the machine readable instructions. Additionally or alternatively, the installer signing circuitry 245 may be instantiated by any other combination of hardware, software, and/or firmware. For example, the installer signing circuitry 245 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example secured installer creator circuitry 250 of the illustrated example of FIG. 2 creates the installer package/secured installer to be installed on the endpoint 120 by attaching the signed configuration to the installer. In some examples, the secured installer creator circuitry 250 is instantiated by processor circuitry executing secured installer creator instructions and/or configured to perform operations such as those represented by the flowchart of FIG. 4.

In some examples, the ePolicy orchestrator 200 includes means for creating a secured installer. For example, the means for creating may be implemented by secured installer creator circuitry 250. In some examples, the secured installer creator circuitry 250 may be instantiated by processor circuitry such as the example processor circuitry 712 of FIG. 7. For instance, the secured installer creator circuitry 250 may be instantiated by the example microprocessor 800 of FIG. 8 executing machine executable instructions such as those implemented by at least blocks 470 of FIG. 7. In some examples, the secured installer creator circuitry 250 may be instantiated by hardware logic circuitry, which may be implemented by an ASIC, XPU, or the FPGA circuitry 900 of FIG. 9 structured to perform operations corresponding to the machine readable instructions. Additionally or alternatively, the secured installer creator circuitry 250 may be instantiated by any other combination of hardware, software, and/or firmware. For example, the secured installer creator circuitry 250 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example secured installer deployment circuitry 255 of the illustrated example of FIG. 2 deploys the secured installation package/secured installer to the endpoint 120. In some examples, the secured installer deployment circuitry 255 is instantiated by processor circuitry executing secured installer deployment instructions and/or configured to perform operations such as those represented by the flowchart of FIG. 4.

In some examples, the ePolicy orchestrator 200 includes means for deploying the secured installer/installation package to the endpoint 120. For example, the means for deploying may be implemented by secured installer deployment circuitry 255. In some examples, the secured installer deployment circuitry 255 may be instantiated by processor circuitry such as the example processor circuitry 712 of FIG. 7. For instance, the secured installer deployment circuitry 255 may be instantiated by the example microprocessor 800 of FIG. 8 executing machine executable instructions such as those implemented by at least blocks 480 of FIG. 4. In some examples, the secured installer deployment circuitry 255 may be instantiated by hardware logic circuitry, which may be implemented by an ASIC, XPU, or the FPGA circuitry 900 of FIG. 9 structured to perform operations corresponding to the machine readable instructions. Additionally or alternatively, the secured installer deployment circuitry 255 may be instantiated by any other combination of hardware, software, and/or firmware. For example, the secured installer deployment circuitry 255 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example agent handler circuitry 260 of the illustrated example of FIG. 2 provides a communication link between the installed endpoint 120 and the ePO 200. An agent handler (e.g., the agent handler 350 of FIG. 3), facilitates the communication of information between the endpoint 120 and the ePO 200. Such information may include configurations that are stored within a database (e.g., the database 320 of FIG. 3). In some examples, the communication link between the endpoint 120 and the ePO 200 allows the proper operation of the endpoint 120 and allows the ePO 200 to monitor the functionality of the endpoint 120 (e.g., to monitor for errors, irregularities, etc.). In some examples, the agent handler circuitry 260 is instantiated by processor circuitry executing agent handler instructions and/or configured to perform operations such as those represented by the flowchart of FIG. 4.

In some examples, the ePolicy orchestrator 200 includes means for establishing a communication link between the ePO 200 and the endpoint 120. For example, the means for establishing may be implemented by agent handler circuitry 260. In some examples, the agent handler circuitry 260 may be instantiated by processor circuitry such as the example processor circuitry 712 of FIG. 7. For instance, the agent handler circuitry 260 may be instantiated by the example microprocessor 800 of FIG. 8 executing machine executable instructions such as those implemented by at least blocks 490 of FIG. 4. In some examples, the agent handler circuitry 260 may be instantiated by hardware logic circuitry, which may be implemented by an ASIC, XPU, or the FPGA circuitry 900 of FIG. 9 structured to perform operations corresponding to the machine readable instructions. Additionally or alternatively, the agent handler circuitry 260 may be instantiated by any other combination of hardware, software, and/or firmware. For example, the agent handler circuitry 260 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

FIG. 3 is a diagram 300 illustrating an example process for securely configuring an endpoint (e.g., the endpoint 120). In the illustrated example of FIG. 3, an ePO Administrator (admin) 305 provides a pre-built binary that is responsible for installing the agent (e.g., an endpoint installer 340). This pre-built binary is delivered to the ePO 200 as a signed executable so a customer can verify the provider of the installer (arrow 308). Ordinarily, the binary signature of the Endpoint Installer is invalidated when the configuration information is embedded into the executable. In case of a lighter version of the endpoint installer, the configuration is attached beyond the PE structure of the binary. In either case, the configuration information is suspectable to malicious actors if they want to modify the details embedded.

The ePO 200 provides a user interface (UI) to an ePO admin 305. In some examples, the UI is provided via a web interface. For example, the ePO 200 may host a web server that provides instructions that cause a browser or another application of a computing device operated by the ePO administrator 305 to present an interface to the ePO administrator 305. Any interaction an ePO admin 305 might have to download/configure would be through interacting through the web interface or console supplied by the ePO 200. For example, the ePO administrator 305 obtains a certificate from a trusted certificate authority 310 (arrow 312) and provides the certificate/pre-built binary to the ePO 200 as disclosed above (arrow 308). In other examples, the trusted certificate authority 310 provides the certificate directly to the ePO 200 either by generating the certificate or importing the certificate (arrow 314). In some examples, the trusted certificate authority 310 may be implemented as a component of the ePO 200. In other words, the generated certificates may be self-signed and/or generated at the direction of the ePO 200.

The ePO 200 stores the certificate, among other secret information, such as keys, etc. are in the keystore memory 220 (arrow 316). In examples disclosed herein, the keystore memory 220 is locally accessible only to the ePO 200. Configuration information like server address, port details, and public certificates are stored in a database 320 (arrow 322). In some examples, the database 320 may be implemented as a part of the keystore memory 220. However, in some other examples, the database 320 may be implemented separately from the keystore memory 220.

The ePO 200 provides an installer package 330 that will be modified (secured) by the ePO 200 for distribution to the endpoint. The ePO 200 obtains the configuration information stored in the database 320 and uses such configuration information to prepare the configuration 127. The configuration 127 is then attached to the installer package 330 by the ePO 200 (arrow 324). The configuration file is then signed by the ePO using the private key associated with the provided certificate. The installer package 330 is then sent to the endpoint installer (arrow 328) and the secured configuration is then supplied to the endpoint installer to create a secured endpoint installer 340 (arrow 326). The secured endpoint installer is then deployed to an endpoint 120 (arrow 332).

The agent handler 350 then creates a communication link to enable communication with the ePO using the secured configuration (arrow 334). In some examples, the agent handler 350 may communicate with the database 320 to access and/or store information to the database 320 (arrow 336). In some examples, the endpoint 120 may be able to access information from the database 320 through the agent handler 350 (e.g., again via arrow 334).

While an example manner of implementing the cloud ePolicy orchestrator 110 and/or the on-premise ePolicy orchestrator 112 of FIG. 1 is illustrated in FIG. 2 (e.g., the example ePolicy orchestrator 200), one or more of the elements, processes, and/or devices illustrated in FIG. 2 may be combined, divided, re-arranged, omitted, eliminated, and/or implemented in any other way. Further, the example certificate access circuitry 230, certificate importer circuitry 235, installer accessor circuitry 240, installer signing circuitry 245, secured installer creator circuitry 250, secured installer deployment circuitry 255, agent handler circuitry 260, and/or, more generally, the example ePolicy orchestrator 200 of FIG. 2, may be implemented by hardware alone or by hardware in combination with software and/or firmware. Thus, for example, any of the example certificate access circuitry 230, certificate importer circuitry 235, installer accessor circuitry 240, installer signing circuitry 245, secured installer creator circuitry 250, secured installer deployment circuitry 255, agent handler circuitry 260, and/or, more generally, the example ePolicy orchestrator 200, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example ePolicy orchestrator 200 of FIG. 2 may include one or more elements, processes, and/or devices in addition to, or instead of, those illustrated in FIG. 2, and/or may include more than one of any or all of the illustrated elements, processes and devices.

Figure 4:
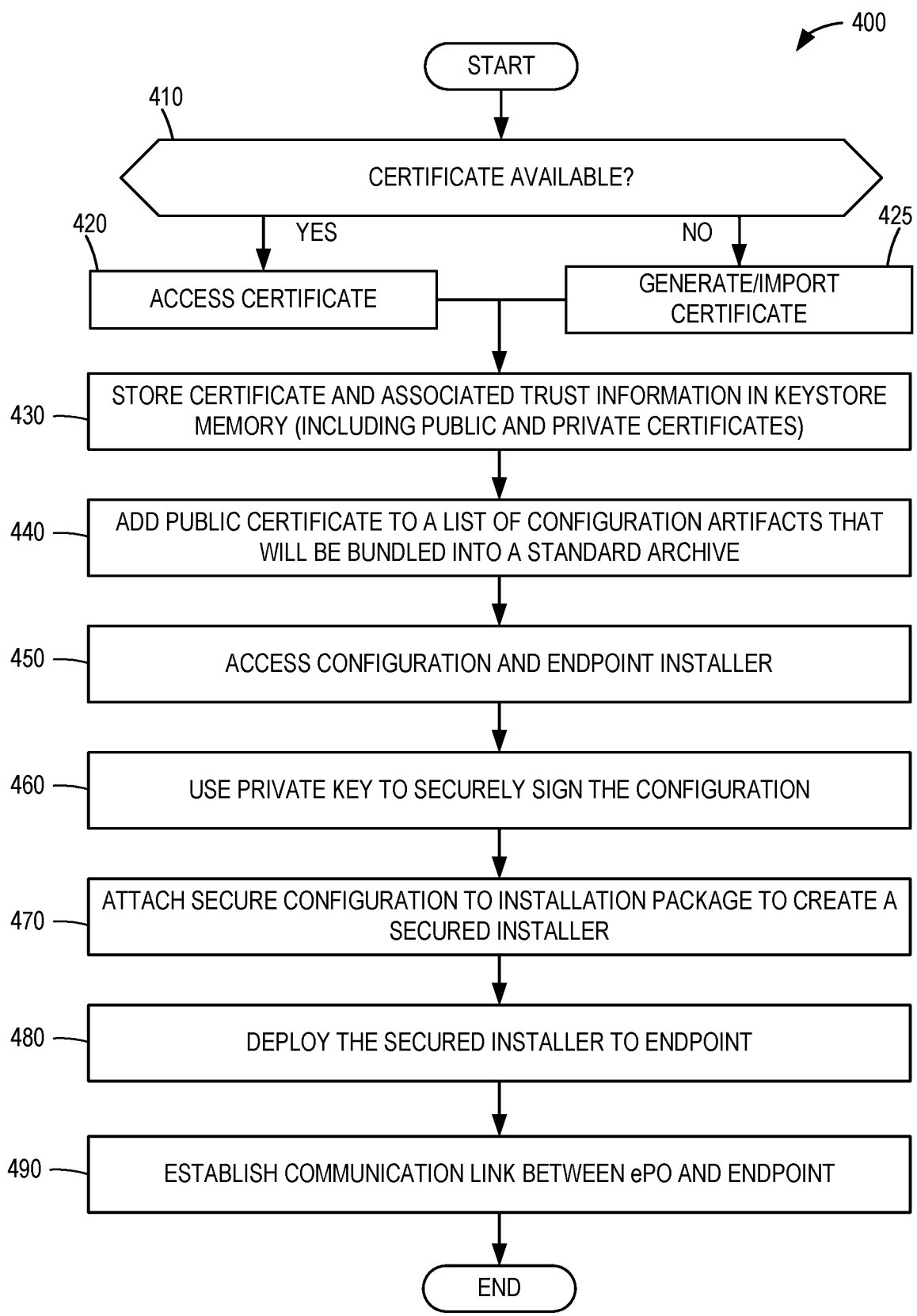
FIG. 4 is a flowchart representative of example machine readable instructions and/or example operations that may be executed by example processor circuitry to implement the ePolicy orchestrator of FIG. 2.

A flowchart representative of example machine readable instructions, which may be executed to configure processor circuitry to implement the ePolicy orchestrator 200 of FIG. 2, is shown in FIG. 4. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIG. 4, many other methods of implementing the example ePolicy orchestrator 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 4 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or example operations that may be executed and/or instantiated by processor circuitry to create and deploy a secured installer package. The example secured installation package implementation process 400 of FIG. 4 begin at block 410, at which the installer modification circuitry 210 determines whether a certificate is available. (Block 410). For example, the installer modification circuitry 210 determines whether a certificate has been provided by an administrator (e.g., the ePO administrator 305 of FIG. 3).

If a certificate has been provided (e.g., block 410 returns a result of YES), the certificate access circuitry 230 accesses the certificate provided by the administrator 305. (Block 420). If no certificate is available (e.g., no certificate had been provided by the administrator 305, resulting in block 410 returning a result of NO), the example certificate importer circuitry 235 generates a certificate or imports a certificate from the trusted certificate authority 310. (Block 425). The generated/imported certificate may be, for example, a self-signed certificate.

The example certificate access circuitry 230 or the certificate importer circuitry 235, depending on whether the certificate was accessed or generated per the instructions of blocks 420 or 425, stores the certificate and associated trust information in the keystore memory 220. (Block 430). The associated trust information includes, for example, public and private components of the certificate.

The example certificate access circuitry 230 or the certificate importer circuitry 235, depending on whether the certificate was accessed or generated per the instructions of blocks 420 or 425, adds the public component of the certificate to a list of configuration artifacts that will be bundled into a secured installation package. (Block 440). Such public component configuration artifacts may include information such as the server address, port details, and/or public certificates stored in the database 320 that can be available in a different part of the network (e.g., the endpoint 120).

The example installer accessor circuitry 240 accesses the configuration information and a provided endpoint installer. (Block 450). Thus, the installer accessor circuitry 240 provides information (e.g., the configuration information and the endpoint installer to define a destination point for the installer) to create a secured installation package. In some examples, the installer accessor circuitry 240 creates an internal (e.g., internal to the ePO 200) list of information that should be verified before the installation package may be signed.

The example installer signing circuitry 245 signs the configuration provided by the installer accessor circuitry 240. (Block 460). In some examples, the installer signing circuitry 245 signs the configuration using a private key. In some examples, the private key may be accessed from the keystore memory 220. In some examples, the private key may be located in the configuration or locally in random access memory (RAM) to be deleted after the configuration is signed.

The example secured installer creator circuitry 250 creates the installer package to be installed on the endpoint 120. (Block 470). In some examples, the secured installer creator circuitry 250 attaches the secured configuration (e.g., the configuration after being signed) to an installation package to create a secured installer. In some examples, the secured installer creator circuitry 250 creates an executable installed (e.g., a .exe file) to be run on the endpoint 120 to install the configuration.

The example secured installer deployment circuitry 255 deploys the secured installation package/installer to the endpoint 120. (Block 480). In some examples, the deployment of the secured installation package/installer occurs over the network 115. In some examples, the secured installation package/installer is created locally to a customer's network (e.g., outside of the ePO 200), and thus is deployed directly to the endpoint 120 without the use of the network 115.

The example agent handler circuitry 260 creates a communication link between the deployed endpoint 120 and the ePO 200. (Block 590). In some examples, the communication link allows the endpoint 120 and the ePO 200 to send information to and from each other for proper execution and maintenance of the endpoint 120. Once the communication link is established by the agent handler circuitry 260, the example secured installation package implementation process 400 ends.

Figure 5:
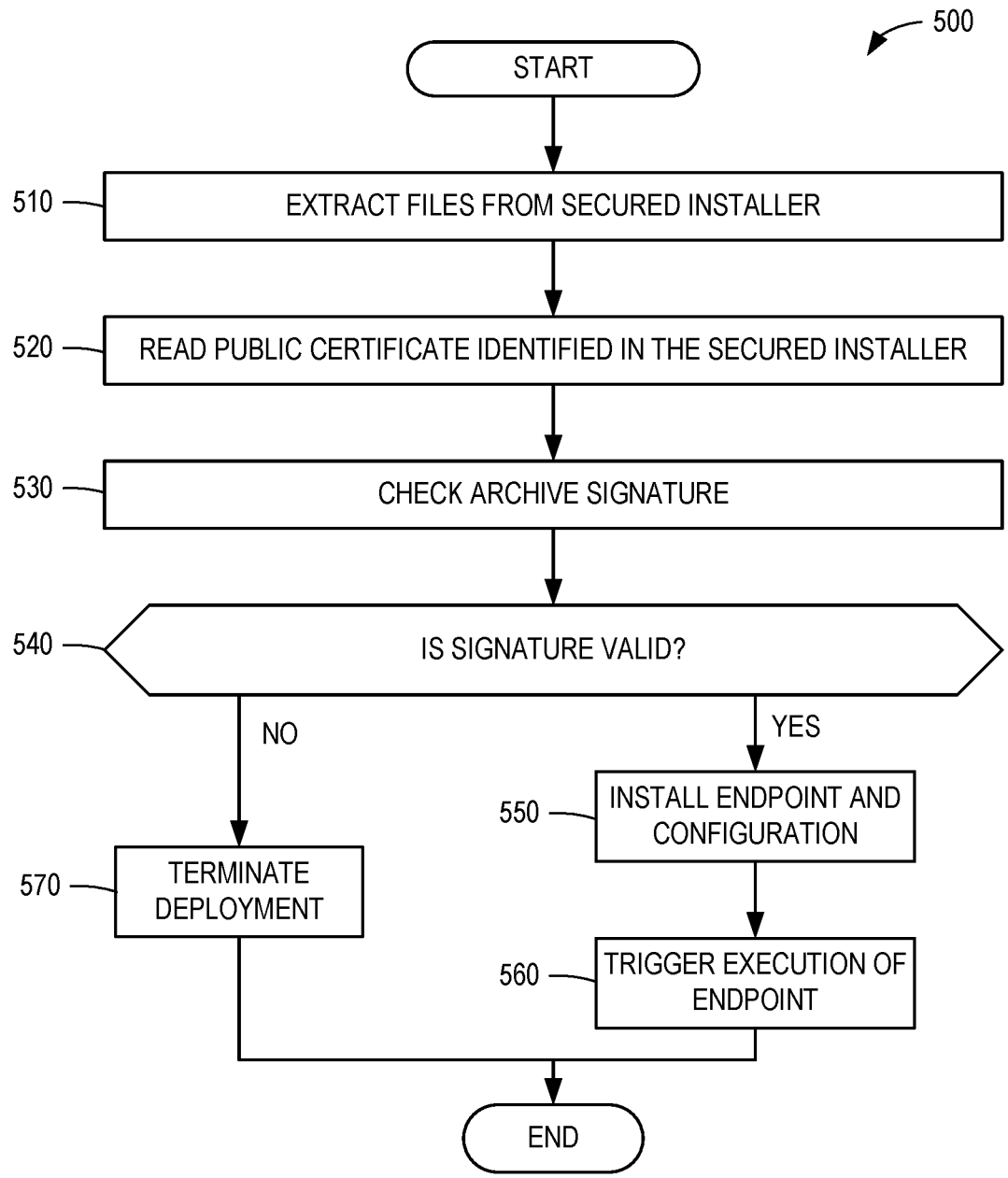
FIG. 5 is a flowchart representative of example machine readable instructions and/or example operations that may be executed by example processor circuitry to install the secured installer generated by the ePolicy orchestrator of FIG. 2.

FIG. 5 is a flowchart representative of example machine readable instructions and/or example operations that may be executed and/or instantiated by processor circuitry to install the secured installer/installation package. The example secured installation execution process 500 of FIG. 5 begin at block 510, at which the installation execution circuitry 130 extracts files from the secured installer/installation package. (Block 510). In some examples, the installer may be deployed in the form of a compressed zip file for quicker deployment over the network 115, and the installer may thus be extracted from the compressed zip file before being executed.

The installation execution circuitry 130 then reads the public certificate identified in the secured installer. (Block 520). In some examples, the endpoint 120 checks the public certificate of the secured installer to verify that the endpoint 120 is the intended target for the installation of the configuration. In other examples, the endpoint 120 may be deployed alongside the secured installer and the public certificate can be used to verify the signature once the secured installer is deployed.

The installation execution circuitry 130 checks the signature of the secured installer. (Block 530). In some examples, such as where the endpoint 120 is not the intended target or where a malicious infiltration of the endpoint 120 and/or the ePO 200 is attempted (e.g., the configuration 127 is corrupted), the installation execution circuitry 130 may determine that the signature is not valid and indicate as such.

Once the installation execution circuitry 130 verifies the signature of the secured installer, the installation execution circuitry 130 determines whether the signature is valid. (Block 540). In some examples, as disclosed above, the installation execution circuitry 130 may determine that there is a malicious tampering present and/or there was an error in the deployment of the secured installer.

When the installation execution circuitry 130 determined that the signature is valid (e.g., block 540 returns a result of YES), the installation execution circuitry 130 triggers the installation of the endpoint with the configuration (e.g., executes the installer/installation package). (Block 550). The installation execution circuitry 130 then triggers the execution of the endpoint 120. (Block 560).

When the installation execution circuitry 130 determines that the signature is invalid (e.g., block 540 returns a result of NO), then the installation execution circuitry 130 terminates the deployment/installation of the secured installer. (Block 570). In some examples, the installation execution circuitry 130 may report the failure/termination of the installer to the ePO 200. When the deployment/installation is terminated or when the deployment/installation of the secured installer is completed, the example secured installation execution process 500 ends.

Figure 6:
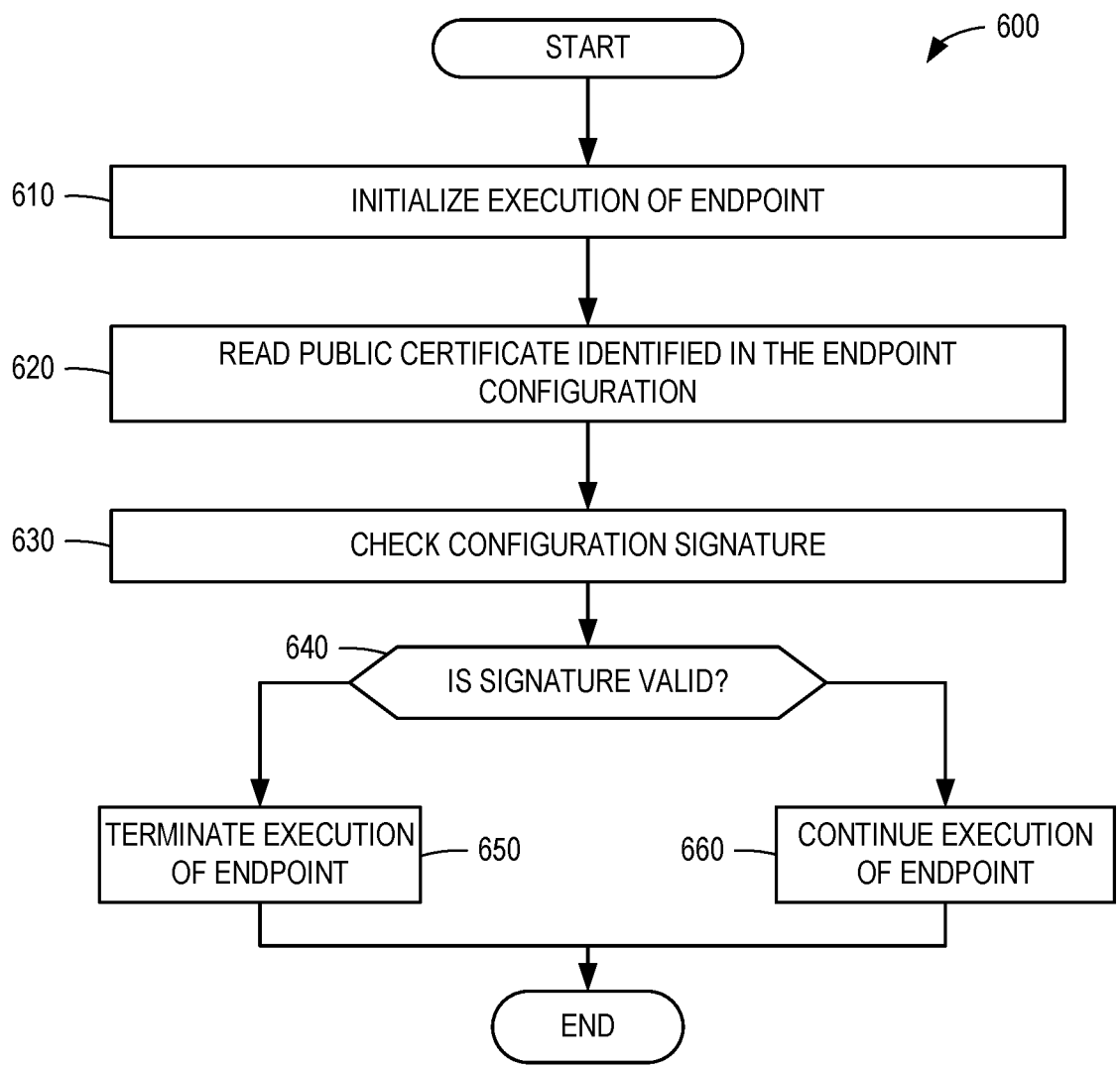
FIG. 6 is a flowchart representative of example machine readable instructions and/or example operations that may be executed by example processor circuitry to execute the endpoint of FIG. 1.

FIG. 6 is a flowchart representative of example machine readable instructions and/or example operations that may be executed and/or instantiated by processor circuitry to execute the endpoint 120. The example endpoint execution process 600 of FIG. 6 begin at block 610, at which the installed agent circuitry 135 initializes the execution of the endpoint 120. (Block 510). In some examples, the configuration contains policies and/or installation/execution instructions for the endpoint 120 (e.g., software updates, policy changes, etc.), and the endpoint 120 may be executed to verify the configuration is valid for the endpoint 120.

The installed agent circuitry 135 reads the public certificate identified in the endpoint 120 configuration. (Block 620). In some examples, the endpoint 120 checks the public certificate of the configuration once installed to verify that the endpoint 120 is the correct target for the configuration. In other examples, the endpoint 120 checks the public certificate of the configuration to ensure no malicious activity is detected on the configuration (e.g., incompatible certificates, incorrect/insufficient installation, etc.)

The installed agent circuitry 135 then checks the configuration signature. (Block 630). In some examples, such as where the endpoint 120 is not the intended target or where a malicious infiltration of the endpoint 120 and/or the ePO 200 is attempted, the installed agent circuitry 135 may determine that the signature is not valid and indicate as such. Redundant signature checks improve the security of the configuration and the secured installer.

The installed agent circuitry 135 then determined whether the signature is valid. (Block 640). In some examples, as disclosed above, the installation execution circuitry 130 may determine that there is a malicious tampering present and/or there was an error in the installation of the configuration on the endpoint 120. In some examples, the determination of whether the signature is valid results in an execution status of the endpoint (e.g., the endpoint is executing, can execute, terminated, etc.).

When the installed agent circuitry 135 determines that the signature is valid (e.g., block 640 returns a result of YES), the installed agent circuitry 135 continues execution of the endpoint 120. (Block 650). When the installed agent circuitry 135 determines that the signature is invalid (e.g., block 640 returns a result of NO), the installed agent circuitry 135 terminates execution of the endpoint 120. In some examples, the validity of the signature is sent to the ePO 200 to inform the ePO 200 of the status of the endpoint 120 execution. When the execution of the endpoint 120 is either continued or terminated, the example endpoint execution process 600 ends.

Figure 7:
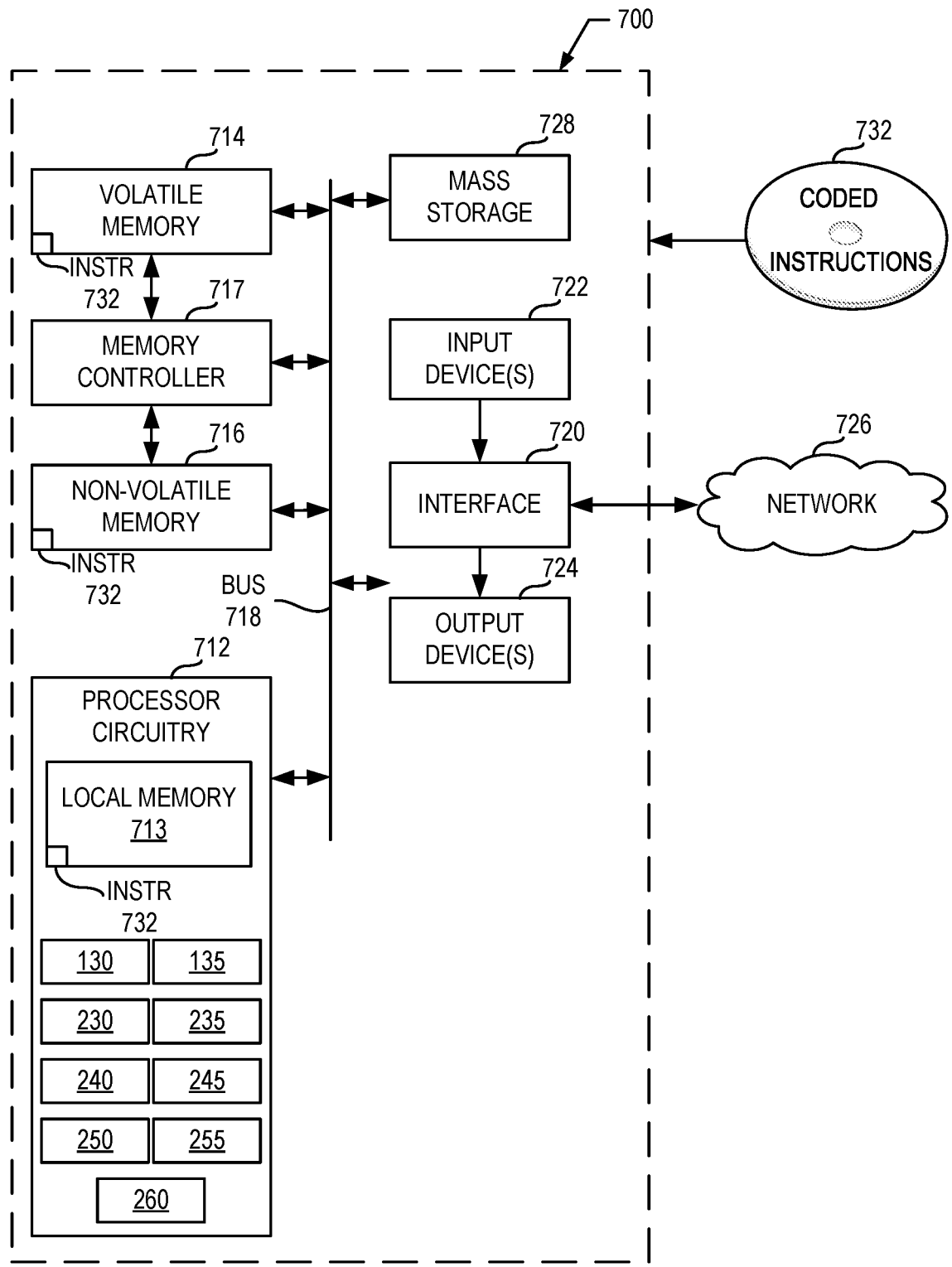
FIG. 7 is a block diagram of an example processing platform including processor circuitry structured to execute the example machine readable instructions and/or the example operations of FIGS. 4-6 to implement the example ePolicy orchestrator of FIG. 2.

FIG. 7 is a block diagram of an example processor platform 700 structured to execute and/or instantiate the machine readable instructions and/or the operations of FIG. 4 to implement the installer modification circuitry 210 of FIG. 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs, microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements installation execution circuitry 130, installed agent circuitry 135, certificate access circuitry 230, certificate importer circuitry 235, installer accessor circuitry 240, installer signing circuitry 245, secured installer creator circuitry 250, secured installer deployment circuitry 255, and agent handler circuitry 260.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, a keyboard, a button, a mouse, a touchscreen, a track-pad, a trackball, and/or an isopoint device.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.). The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 732, which may be implemented by the machine readable instructions of FIG. 4, may be stored in the mass storage device 728, in the volatile memory 714, in the non-volatile memory 716, and/or on a removable non-transitory computer readable storage medium such as a CD or DVD.

Figure 8:
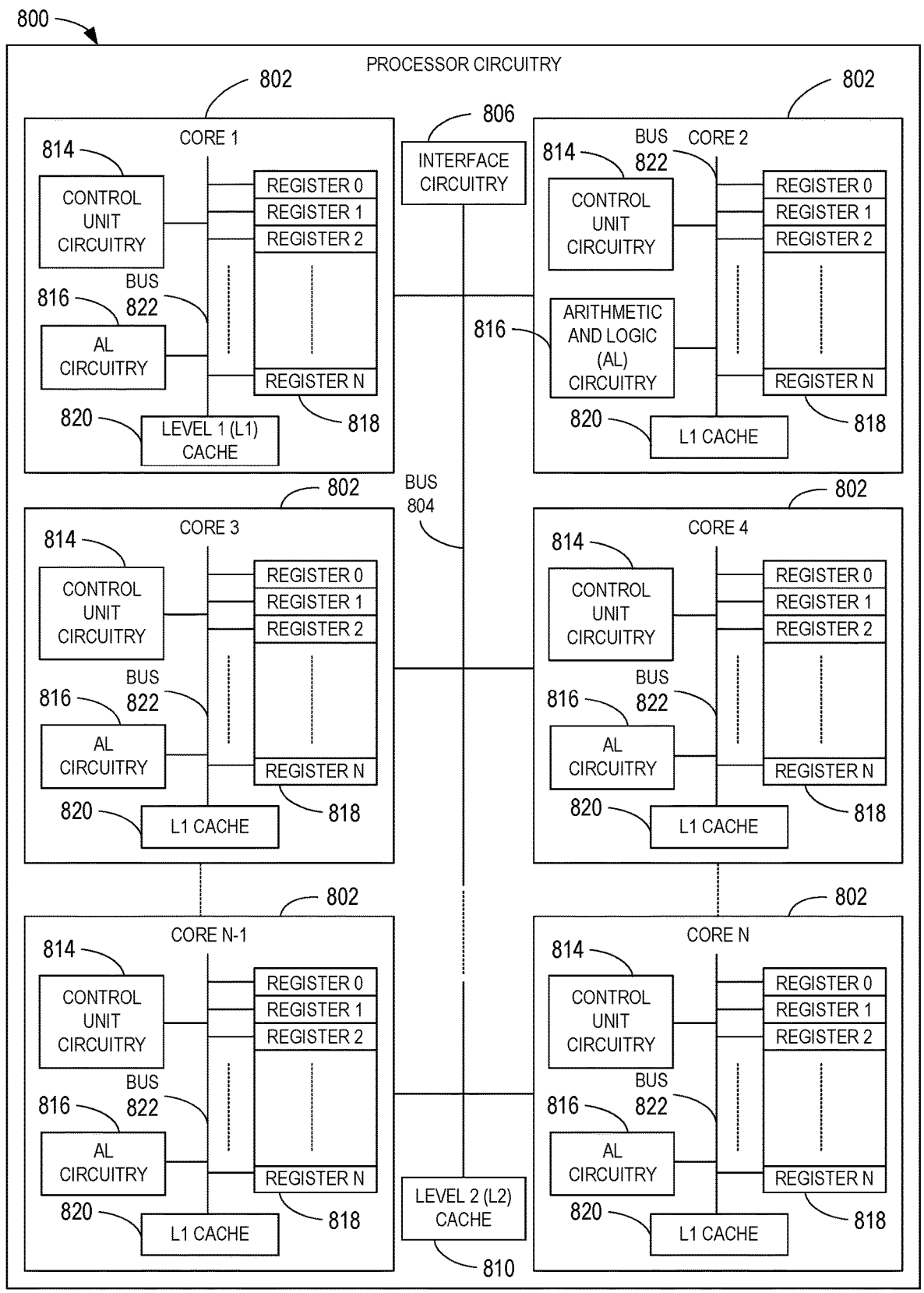
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a microprocessor 800. For example, the microprocessor 800 may be a general purpose microprocessor (e.g., general purpose microprocessor circuitry). The microprocessor 800 executes some or all of the machine readable instructions of the flowchart of FIG. 4 to effectively instantiate the installer modification circuitry 210 of FIG. 2 as logic circuits to perform the operations corresponding to those machine readable instructions. In some such examples, the installer modification circuitry 210 of FIG. 2 is instantiated by the hardware circuits of the microprocessor 800 in combination with the instructions. For example, the microprocessor 800 may be implemented by multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowchart of FIG. 4.

The cores 802 may communicate by a first example bus 804. In some examples, the first bus 804 may be implemented by a communication bus to effectuate communication associated with one(s) of the cores 802. For example, the first bus 804 may be implemented by at least one of an Inter-Integrated Circuit (I2C) bus, a Serial Peripheral Interface (SPI) bus, a PCI bus, or a PCIe bus. Additionally or alternatively, the first bus 804 may be implemented by any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2 cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the local memory 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The second bus 822 may be implemented by at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
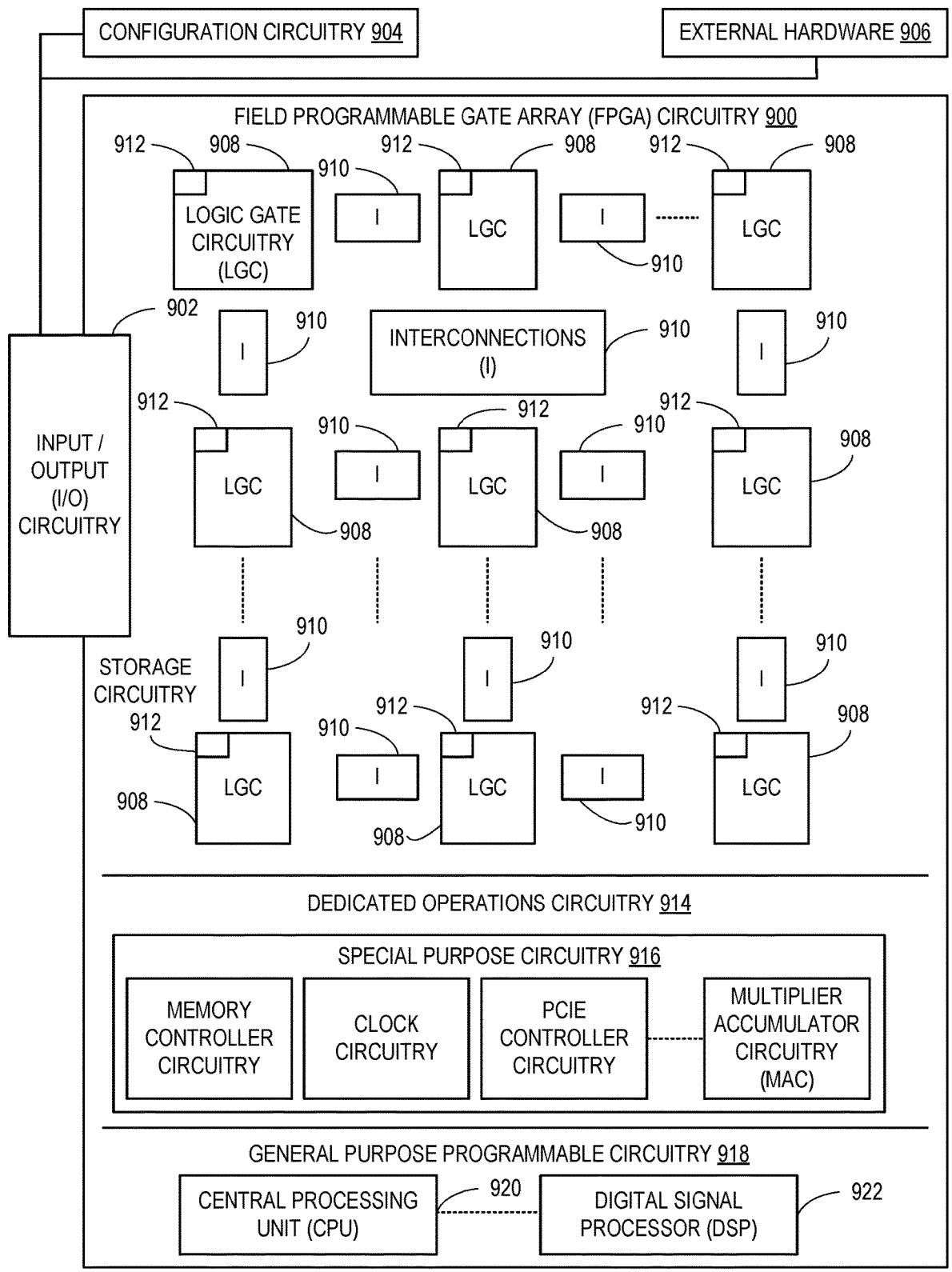
FIG. 9 is a block diagram of another example implementation of the processor circuitry of FIG. 7.

FIG. 9 is a block diagram of another example implementation of the processor circuitry 712 of FIG. 7. In this example, the processor circuitry 712 is implemented by FPGA circuitry 900. For example, the FPGA circuitry 900 may be implemented by an FPGA. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowchart of FIG. 4 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowchart of FIG. 4. In particular, the FPGA circuitry 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowchart of FIG. 4. As such, the FPGA circuitry 900 may be structured to effectively instantiate some or all of the machine readable instructions of the flowchart of FIG. 4 as dedicated logic circuits to perform the operations corresponding to those software instructions in a dedicated manner analogous to an ASIC. Therefore, the FPGA circuitry 900 may perform the operations corresponding to the some or all of the machine readable instructions of FIG. 4 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware 906. For example, the configuration circuitry 904 may be implemented by interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may be implemented by external hardware circuitry. For example, the external hardware 906 may be implemented by the microprocessor 800 of FIG. 8. The FPGA circuitry 900 also includes an array of example logic gate circuitry 908, a plurality of example configurable interconnections 910, and example storage circuitry 912. The logic gate circuitry 908 and the configurable interconnections 910 are configurable to instantiate one or more operations that may correspond to at least some of the machine readable instructions of FIG. 4 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The configurable interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowchart of FIG. 4 may be executed by one or more of the cores 802 of FIG. 8, a second portion of the machine readable instructions represented by the flowchart of FIG. 4 may be executed by the FPGA circuitry 900 of FIG. 9, and/or a third portion of the machine readable instructions represented by the flowchart of FIG. 4 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 712 of FIG. 7 may be in one or more packages. For example, the microprocessor 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Figure 10:
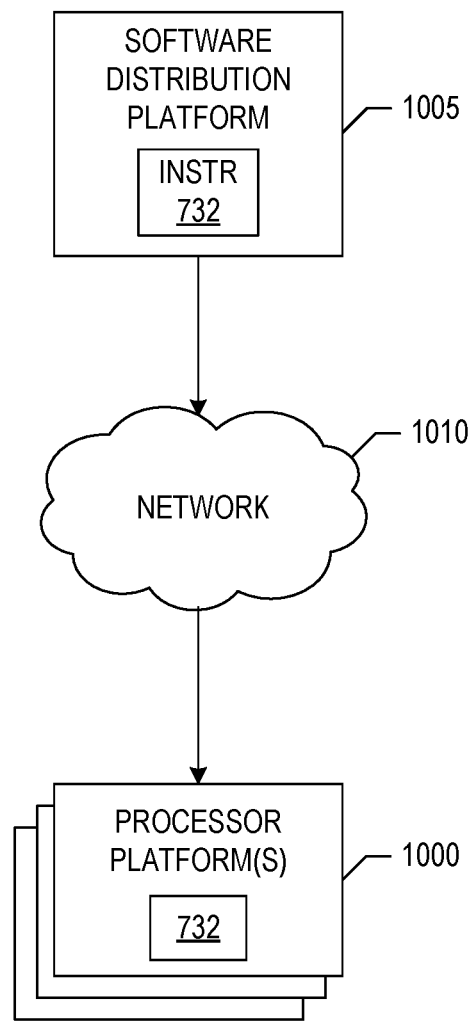
FIG. 10 is a block diagram of an example software distribution platform (e.g., one or more servers) to distribute software (e.g., software corresponding to the example machine readable instructions of FIGS. 4-6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 7 to hardware devices owned and/or operated by third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine readable instructions 732, which may correspond to the example machine readable instructions of FIG. 4, as described above. The one or more servers of the example software distribution platform 1005 are in communication with an example network 1010, which may correspond to any one or more of the Internet and/or any of the example networks 726 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 from the software distribution platform 1005. For example, the software, which may correspond to the example machine readable instructions of FIG. 4, may be downloaded to the example processor platform 700, which is to execute the machine readable instructions 732 to implement the installer modification circuitry 210. In some examples, one or more servers of the software distribution platform 1005 periodically offer, transmit, and/or force updates to the software (e.g., the example machine readable instructions 732 of FIG. 7) to ensure improvements, patches, updates, etc., are distributed and applied to the software at the end user devices.

From the foregoing, it will be appreciated that example systems, methods, apparatus, and articles of manufacture have been disclosed that securely configure a compute device. Disclosed systems, methods, apparatus, and articles of manufacture improve the efficiency of using a computing device by securing an endpoint configuration prior to deploying the configuration to the endpoint to mitigate malicious tampering and/or erroneous installations. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to securely configure an endpoint are disclosed herein. Further examples and combinations thereof include the following:

Example 1 includes an apparatus comprising memory, machine readable instructions, and processor circuitry to at least one of instantiate or execute the machine readable instructions to access a certificate at an ePolicy orchestrator, the certificate including private key information, access a configuration, the configuration including policy information and installation instructions, sign the configuration using the private key information to securely sign the configuration, the signed configuration including a secured signature, create a secured installer using the certificate and the signed configuration, the secured installer including an agent, and provide the secured installer to an endpoint for installation of the agent and execution of the endpoint.

Example 2 includes the apparatus of example 1, wherein the ePolicy orchestrator is a cloud-based ePolicy orchestrator located in a remote location.

Example 3 includes the apparatus of example 1, wherein the ePolicy orchestrator is an on-premise ePolicy orchestrator located on site with the endpoint.

Example 4 includes the apparatus of example 1, wherein the certificate is provided by an administrator of the ePolicy orchestrator.

Example 5 includes the apparatus of example 1, wherein the processor circuitry is further to request generation of the certificate by a trusted certificate authority.

Example 6 includes the apparatus of example 1, wherein the processor circuitry is further to generate the certificate.

Example 7 includes the apparatus of example 1, wherein the processor circuitry is further to store the certificate in a keystore memory located at the ePolicy orchestrator.

Example 8 includes the apparatus of example 1, wherein the certificate is a private certificate.

Example 9 includes the apparatus of example 8, wherein the processor circuitry is further to access a public certificate containing public key information at the ePolicy orchestrator.

Example 10 includes the apparatus of example 1, wherein the processor circuitry is further to establish a communication link between the ePolicy orchestrator and the endpoint.

Example 11 includes a non-transitory machine readable storage medium comprising instructions that, when executed, cause processor circuitry to at least access a certificate at an ePolicy orchestrator, the certificate including private key information, access a configuration, the configuration including policy information and installation instructions, sign the configuration using the private key information to securely sign the configuration, the signed configuration including a secured signature, create a secured installer using the certificate and the signed configuration, the secured installer including an agent, and provide the secured installer to an endpoint for installation of the agent and execution of the endpoint.

Example 12 includes the non-transitory machine readable storage medium of example 11, wherein the ePolicy orchestrator is a cloud-based ePolicy orchestrator located in a remote location.

Example 13 includes the non-transitory machine readable storage medium of example 11, wherein the ePolicy orchestrator is an on-premise ePolicy orchestrator located on site with the endpoint.

Example 14 includes the non-transitory machine readable storage medium of example 11, wherein the instructions, when executed, cause the processor circuitry to access the certificate from an administrator of the ePolicy orchestrator.

Example 15 includes the non-transitory machine readable storage medium of example 11, wherein the instructions, when executed, cause the processor circuitry to request generation of the certificate by a trusted certificate authority.

Example 16 includes the non-transitory machine readable storage medium of example 11, wherein the instructions, when executed, cause the processor circuitry to generate the certificate.

Example 17 includes the non-transitory machine readable storage medium of example 11, wherein the instructions, when executed, cause the processor circuitry to store the certificate in a keystore memory located at the ePolicy orchestrator.

Example 18 includes the non-transitory machine readable storage medium of example 11, wherein the certificate is a private certificate.

Example 19 includes the non-transitory machine readable storage medium of example 18, wherein the instructions, when executed, cause the processor circuitry to access a public certificate containing public key information at the ePolicy orchestrator.

Example 20 includes the non-transitory machine readable storage medium of example 11, wherein the instructions, when executed, cause the processor circuitry to establish a communication link between the ePolicy orchestrator and the endpoint.

Example 21 includes a method for securely configuring an endpoint, the method comprising accessing a certificate at an ePolicy orchestrator server, the certificate including private key information, accessing a configuration, the configuration including policy information and installation instructions, signing the configuration using the private key information to securely sign the configuration, the signed configuration including a secured signature, creating a secured installer using the certificate and the signed configuration, the secured installer including an agent, and providing the secured installer to an endpoint for installation of the agent and execution of the endpoint.

Example 22 includes the method of example 21, wherein the ePolicy orchestrator is a cloud-based ePolicy orchestrator located in a remote location.

Example 23 includes the method of example 21, wherein the ePolicy orchestrator is an on-premise ePolicy orchestrator located on site with the endpoint.

Example 24 includes the method of example 21, further including accessing the certificate from an administrator of the ePolicy orchestrator.

Example 25 includes the method of example 21, further including requesting generation of the certificate by a trusted certificate authority.

Example 26 includes the method of example 21, further including generating the certificate.

Example 27 includes the method of example 21, further including storing the certificate in a keystore memory located at the ePolicy orchestrator.

Example 28 includes the method of example 21, wherein the certificate is a private certificate.

Example 29 includes the method of example 28, further including accessing a public certificate containing public key information at the ePolicy orchestrator.

Example 30 includes the method of example 21, further including establishing a communication link between the ePolicy orchestrator and the endpoint.

Example 31 includes an apparatus comprising first means for accessing a certificate at an ePolicy orchestrator, the certificate including private key information, second means for accessing a configuration, the configuration including policy information and installation instructions, means for signing the configuration, the means for signing to use the private key information to securely sign the configuration, the signed configuration including a secured signature, means for creating a secured installer using the certificate and the signed configuration, the secured installer including an agent, and means for deploying the secured installer to an endpoint for installation of the agent and execution of the endpoint.

Example 32 includes the apparatus of example 31, further including means for importing the certificate from a trusted certificate authority.

Example 33 includes the apparatus of example 31, further including means for generating the certificate.

Example 34 includes the apparatus of example 33, further including means for requesting the certificate to be generated by the means for generating.

Example 35 includes the apparatus of example 31, further including means for storing the certificate in a keystore memory located at the ePolicy orchestrator.

Example 36 includes the apparatus of example 31, further including means for establishing a communication link between the ePolicy orchestrator and the endpoint.

Example 37 includes an apparatus comprising memory, machine readable instructions, and processor circuitry to at least one of instantiate or execute the machine readable instructions to extract one or more files from a secured installer, the one or more files including a configuration for an endpoint provided by a server, the secured installer including an agent, read a certificate from the configuration, the certificate including information about the endpoint, determine an action to be taken by the secured installer based on the information provided in the certificate, and determine an execution status of the endpoint based on the action to be taken by the secured installer and the configuration.

Example 38 includes the apparatus of example 37, wherein the secured installer includes a secured signature, and the processor circuitry is to determine whether the secured signature matches the secured installer.

Example 39 includes the apparatus of example 38, wherein the processor circuitry is to terminate the installation of the agent on the endpoint when the secured installer does not match the secured signature.

Example 40 includes the apparatus of example 38, wherein the processor circuitry is to install the agent on the endpoint.

Example 41 includes the apparatus of example 40, wherein the processor circuitry is to read the public certificate for endpoint execution instructions.

Example 42 includes the apparatus of example 41, wherein the processor circuitry is further to terminate execution of the endpoint when the signature does not match the configuration.

Example 43 includes the apparatus of example 41, wherein the processor circuitry is further to execute the endpoint when the signature matches the configuration.

Example 44 includes the apparatus of example 43, wherein the processor circuitry is further to communicate with the server via a communication link established by the server.

Example 45 includes a non-transitory machine readable storage medium comprising instructions that, when executed, cause processor circuitry to at least extract files from a secured installer, the files including a configuration for an endpoint provided by a server, the secured installer including an agent, read a public certificate from the configuration, the public certificate including information about the endpoint, determine an action to take on the secured installer based on the information provided by the public certificate, and determine an execution status of the endpoint based on the action taken on the secured installer and the configuration.

Example 46 includes the non-transitory machine readable storage medium of example 45, wherein the secured installer includes a secured signature, the instructions, when executed, cause the processor circuitry to determine whether the secured signature matches the secured installer.

Example 47 includes the non-transitory machine readable storage medium of example 46, wherein the instructions, when executed, cause the processor circuitry to terminate installing the agent on the endpoint when the secured installer does not match the secured signature.

Example 48 includes the non-transitory machine readable storage medium of example 46, wherein the instructions, when executed, cause the processor circuitry to install the agent on the endpoint.

Example 49 includes the non-transitory machine readable storage medium of example 48, wherein the instructions, when executed, cause the processor circuitry to read the public certificate for endpoint execution instructions.

Example 50 includes the non-transitory machine readable storage medium of example 49, wherein the instructions, when executed, cause the processor circuitry to terminate execution of the endpoint when the signature does not match the configuration.

Example 51 includes the non-transitory machine readable storage medium of example 49, wherein the instructions, when executed, cause the processor circuitry to execute the endpoint when the signature matches the configuration.

Example 52 includes the non-transitory machine readable storage medium of example 51, wherein the instructions, when executed, cause the processor circuitry to communicate with the server via a communication link established by the server.

Example 53 includes a method comprising extracting files from a secured installer, the files including a configuration for an endpoint provided by a server, the secured installer including an agent, reading a public certificate from the configuration, the public certificate including information about the endpoint, determining an action to take on the secured installer based on the information provided by the public certificate, and determining an execution status of the endpoint based on the action taken on the secured installer and the configuration.

Example 54 includes the method of example 53, wherein the secured installer includes a secured signature, the method further including determining whether the secured signature matches the secured installer.

Example 55 includes the method of example 54, further including terminating installation of the agent on the endpoint when the secured installer does not match the secured signature.

Example 56 includes the method of example 54, further including installing the agent on the endpoint.

Example 57 includes the method of example 56, further including reading the public certificate for endpoint execution instructions.

Example 58 includes the method of example 57, further including terminating execution of the endpoint when the signature does not match the configuration.

Example 59 includes the method of example 57, further including executing the endpoint when the signature matches the configuration.

Example 60 includes the method of example 59, further including communicating with the server via a communication link established by the server.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   memory;
   machine readable instructions; and
   processor circuitry to at least one of instantiate or execute the machine readable instructions to:
   access a certificate at an ePolicy orchestrator, the certificate including private key information;
   access a configuration, the configuration including policy information and installation instructions;
   sign the configuration using the private key information to securely sign the configuration, the signed configuration including a secured signature;
   create a secured installer using the certificate and the signed configuration, the secured installer including an agent; and
   provide the secured installer to an endpoint for installation of the agent and execution of the endpoint.

2. The apparatus of claim 1, wherein the ePolicy orchestrator is a cloud-based ePolicy orchestrator located in a remote location.

3. The apparatus of claim 1, wherein the ePolicy orchestrator is an on-premise ePolicy orchestrator located on site with the endpoint.

4. The apparatus of claim 1, wherein the certificate is provided by an administrator of the ePolicy orchestrator.

5. The apparatus of claim 1, wherein the processor circuitry is further to request generation of the certificate by a trusted certificate authority.

6. The apparatus of claim 1, wherein the processor circuitry is further to generate the certificate.

7. The apparatus of claim 1, wherein the processor circuitry is further to store the certificate in a keystore memory located at the ePolicy orchestrator.

8. The apparatus of claim 1, wherein the certificate is a private certificate.

9. The apparatus of claim 8, wherein the processor circuitry is further to access a public certificate containing public key information at the ePolicy orchestrator.

10. The apparatus of claim 1, wherein the processor circuitry is further to establish a communication link between the ePolicy orchestrator and the endpoint.

11. A non-transitory machine readable storage medium comprising instructions that, when executed, cause processor circuitry to at least:
   access a certificate at an ePolicy orchestrator, the certificate including private key information;
   access a configuration, the configuration including policy information and installation instructions;
   sign the configuration using the private key information to securely sign the configuration, the signed configuration including a secured signature;
   create a secured installer using the certificate and the signed configuration, the secured installer including an agent; and
   provide the secured installer to an endpoint for installation of the agent and execution of the endpoint.

12. The non-transitory machine readable storage medium of claim 11, wherein the ePolicy orchestrator is a cloud-based ePolicy orchestrator located in a remote location.

13. The non-transitory machine readable storage medium of claim 11, wherein the ePolicy orchestrator is an on-premise ePolicy orchestrator located on site with the endpoint.

14. The non-transitory machine readable storage medium of claim 11, wherein the instructions, when executed, cause the processor circuitry to access the certificate from an administrator of the ePolicy orchestrator.

15. The non-transitory machine readable storage medium of claim 11, wherein the instructions, when executed, cause the processor circuitry to request generation of the certificate by a trusted certificate authority.

16. The non-transitory machine readable storage medium of claim 11, wherein the instructions, when executed, cause the processor circuitry to generate the certificate.

17. The non-transitory machine readable storage medium of claim 11, wherein the instructions, when executed, cause the processor circuitry to store the certificate in a keystore memory located at the ePolicy orchestrator.

18. The non-transitory machine readable storage medium of claim 11, wherein the certificate is a private certificate.

19. The non-transitory machine readable storage medium of claim 18, wherein the instructions, when executed, cause the processor circuitry to access a public certificate containing public key information at the ePolicy orchestrator.

20. A method for securely configuring an endpoint, the method comprising:
   accessing a certificate at an ePolicy orchestrator server, the certificate including private key information;
   accessing a configuration, the configuration including policy information and installation instructions;
   signing the configuration using the private key information to securely sign the configuration, the signed configuration including a secured signature;
   creating a secured installer using the certificate and the signed configuration, the secured installer including an agent; and
   providing the secured installer to the endpoint for installation of the agent and execution of the endpoint.

* * * * *

UNITED STATES PATENT AND TRADEMARK OFFICE
CERTIFICATE OF CORRECTION

| | | |
|---|---|---|
| PATENT NO. | : 12,244,736 B2 | Page 1 of 1 |
| APPLICATION NO. | : 18/163108 | |
| DATED | : March 4, 2025 | |
| INVENTOR(S) | : Arvind Srinivasa Babu and Arthur S. Zeigler | |

It is certified that error appears in the above-identified patent and that said Letters Patent is hereby corrected as shown below:

On the Title Page

Item (73), delete "MUSARUBA US LLC" and insert --MUSARUBRA US LLC--.

Signed and Sealed this
Eighth Day of April, 2025

Coke Morgan Stewart
*Acting Director of the United States Patent and Trademark Office*